(12) United States Patent
Bharti

(10) Patent No.: US 11,548,505 B2
(45) Date of Patent: Jan. 10, 2023

(54) VEHICULAR SPEED CONTROL SYSTEM WITH AUTOMATIC SETTING PARAMETERS

(71) Applicant: Magna Electronics Inc., Auburn Hills, MI (US)

(72) Inventor: Brijendra Kumar Bharti, Brampton (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 218 days.

(21) Appl. No.: 17/247,338

(22) Filed: Dec. 8, 2020

(65) Prior Publication Data

US 2021/0171031 A1  Jun. 10, 2021

Related U.S. Application Data

(60) Provisional application No. 62/945,246, filed on Dec. 9, 2019.

(51) Int. Cl.
| | | |
|---|---|---|
| *B60W 30/14* | (2006.01) | |
| *B60W 30/18* | (2012.01) | |
| *B60W 40/08* | (2012.01) | |

(52) U.S. Cl.
CPC .... *B60W 30/146* (2013.01); *B60W 30/18072* (2013.01); *B60W 40/08* (2013.01); *B60K 2310/244* (2013.01); *B60W 2420/42* (2013.01); *B60W 2520/10* (2013.01); *B60W 2540/12* (2013.01)

(58) Field of Classification Search
CPC ....... B60W 30/14–146; B60K 2310/00; B60K 2310/22; B60K 2310/24; B60K 2310/244

USPC .......................................................... 701/93
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,236,929 B1 * | 5/2001 | Sen | F16H 61/21 |
| | | | 701/87 |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 8,694,224 B2 | 4/2014 | Chundrlik, Jr. et al. | |
| 9,090,234 B2 | 7/2015 | Johnson et al. | |
| 9,487,235 B2 | 11/2016 | Bajpai et al. | |

(Continued)

*Primary Examiner* — Robert A Werner
(74) *Attorney, Agent, or Firm* — Honigman LLP

(57) ABSTRACT

A driver assist system for a vehicle includes a vehicle speed sensor disposed at a vehicle. An ECU includes a processor for processing sensor data generated by the vehicle speed sensor. The ECU, responsive to processing at the ECU of sensor data generated by the vehicle speed sensor, determines speed of the vehicle. The ECU, responsive to determining that the speed of the vehicle reaches a vehicle soft lock speed, automatically enables a vehicle speed soft lock. The ECU, responsive to the vehicle reducing speed to the vehicle soft lock speed by coasting, maintains the current vehicle speed at the vehicle soft lock speed. The ECU, responsive to the speed of the vehicle increasing a multiple of a vehicle speed increment above the vehicle soft lock speed, automatically sets an increased vehicle soft lock speed that is the multiple of the vehicle speed increment above the vehicle soft lock speed.

20 Claims, 2 Drawing Sheets

(56) References Cited

U.S. PATENT DOCUMENTS

| | | | |
|---|---|---|---|
| 9,988,047 B2 | 6/2018 | Johnson et al. | |
| 11,142,200 B2 | 10/2021 | Laurent | |
| 2001/0005806 A1* | 6/2001 | Kim | B60K 31/04 |
| | | | 701/112 |
| 2003/0182046 A1* | 9/2003 | Nada | B60W 10/10 |
| | | | 180/170 |
| 2009/0254260 A1 | 10/2009 | Nix et al. | |
| 2013/0261889 A1* | 10/2013 | Sekine | B60W 50/085 |
| | | | 701/93 |
| 2014/0005907 A1 | 1/2014 | Bajpai | |
| 2016/0347175 A1* | 12/2016 | Yamashita | B60K 31/00 |
| 2017/0274904 A1* | 9/2017 | Koide | F02D 31/001 |
| 2018/0093677 A1* | 4/2018 | Yamashita | B60W 50/14 |
| 2021/0094555 A1 | 4/2021 | Bajpai | |

\* cited by examiner

VEHICULAR SPEED CONTROL SYSTEM WITH AUTOMATIC SETTING PARAMETERS

CROSS REFERENCE TO RELATED APPLICATION

The present application claims the filing benefits of U.S. provisional application Ser. No. 62/945,246, filed Dec. 9, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and provides a vehicle speed sensor disposed at a vehicle and a control including circuitry and associated software. The circuitry of the control includes a processor for processing sensor data sent by the vehicle speed sensor, and the control, responsive to processing by the processor at the control of sensor data sent by the vehicle speed sensor, determines a speed of the vehicle. The control, responsive to determining that the speed of the vehicle, reaches a vehicle soft lock speed of travel, enables a vehicle soft lock. The control, responsive to enabling the vehicle soft lock and the vehicle reducing speed to the vehicle soft lock speed by coasting, maintains the vehicle speed at the vehicle soft lock speed. The ECU, responsive to determining that the speed of the vehicle has increased a multiple of a vehicle speed increment above the vehicle soft lock speed, automatically sets an increased vehicle soft lock speed that is the multiple of the vehicle speed increment above the vehicle soft lock speed. The ECU, responsive to the vehicle reducing speed to the increased vehicle soft lock speed by coasting, maintains the vehicle speed at the increased vehicle soft lock speed.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to alter a speed control of a vehicle or assess conditions of the road along which the vehicle is traveling or assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
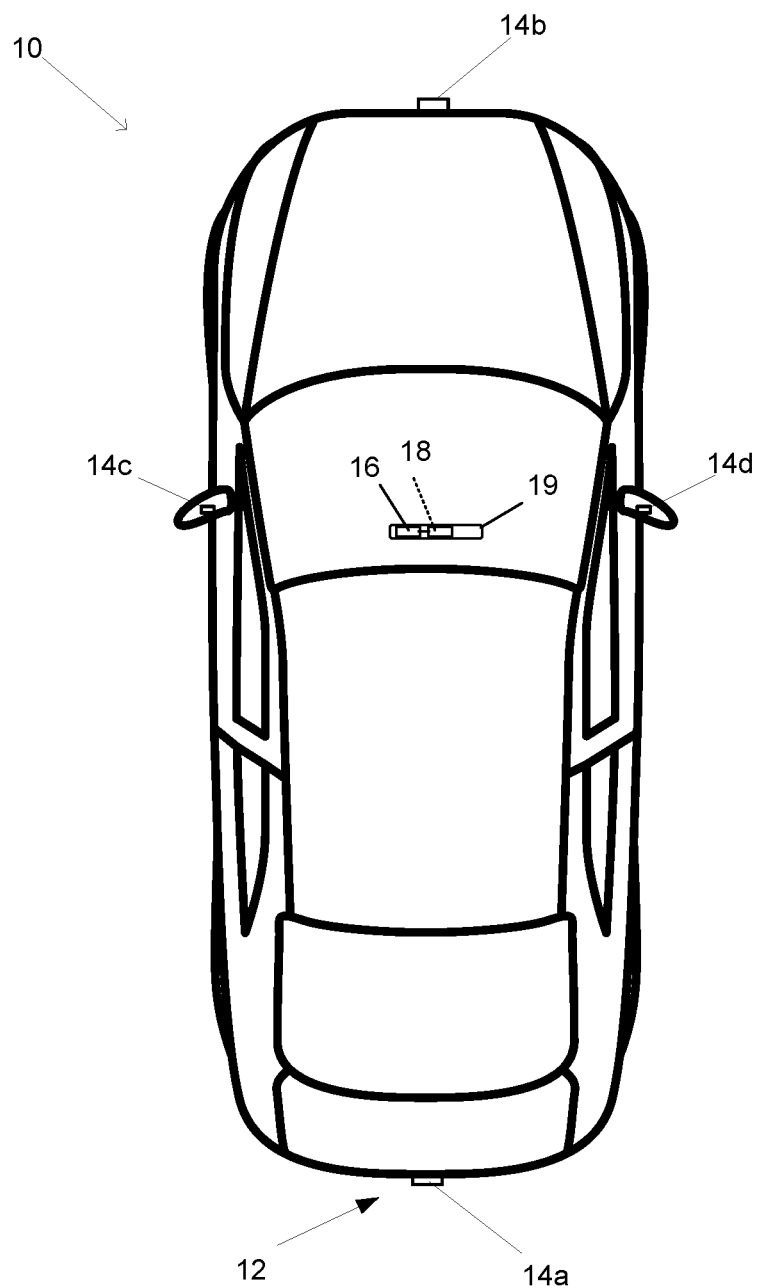
FIG. 1 is a plan view of a vehicle with a vision system that incorporates cameras in accordance with the present invention.

Referring now to the drawings and the illustrative embodiments depicted therein, a vehicle 10 includes an imaging system or vision system or driver assist system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having a data processor and associated circuitry and software, with the data processor being operable to process image data captured by the camera or cameras, whereby the ECU 18 may detect or determine presence of objects or the like and/or the system provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU 18 may comprise any suitable data or communication link, such as a vehicle network bus or the like of the equipped vehicle 10.

A vehicle's speed must be controlled in order to, for example, maintain safe driving practices of the vehicle or follow speed limit regulations as the vehicle travels along roadways. In some instances, such as on long drives, the driver maintains a vehicle's speed by keeping a constant pressure on the foot pedal, which may cause foot fatigue or, with regular use, possibly even injury. While a driver may have methods or tools for maintaining a constant speed of the vehicle other than keeping a constant pressure on the foot pedal with his foot (such as engaging a cruise control system), the driver may desire to maintain manual control of the vehicle's speed (i.e., not engage cruise control), for example, due to traffic, weather, or road conditions. Even when manually controlling the speed of the vehicle, however, the driver may still desire or need to take breaks from applying pressure to the foot pedal to rest their foot.

Figure 2:
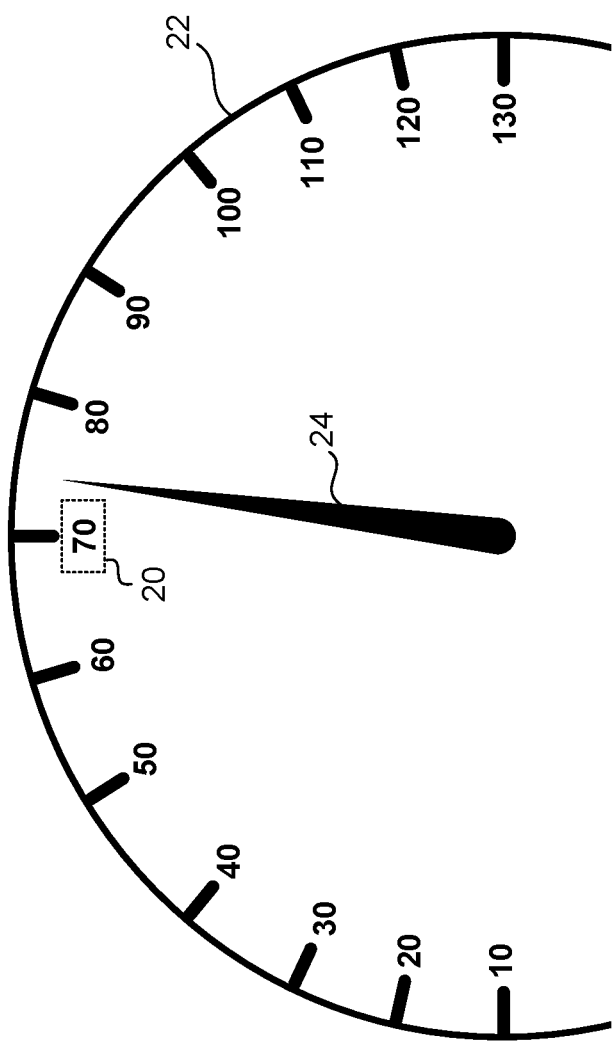
FIG. 2 is schematic view of a speedometer with a soft lock in accordance with the present invention.

Referring now to FIG. 2, the driver assist system 12 may implement a "soft lock" 20 at regular increments of the vehicle's speed. That is, whenever the speed reaches a multiplication of a speed increment (e.g., 1 mile per hour (mph), 5 mph or 10 mph), the system may enable a soft lock 20 at a vehicle soft lock speed (i.e., the multiplication of the speed increment). For example, if the given speed increment for a vehicle's driver assist system 12 is 10 mph, when the speed of the vehicle (e.g., due to the driver accelerating the vehicle) passes above 60 mph, indicated by the speedometer 22 and speedometer needle 24, the system may implement the soft lock 20 at 60 mph as 60 mph is a multiple of the speed increment. Similarly, when the speed of the vehicle passes or crosses above 70 mph, the soft lock 20 would change to 70 mph, as 70 mph is the next multiple of the speed implement (i.e., 10 mph in this example). Thus, the soft lock 20 may change incrementally, as designated by a multiple of a given speed increment, with the speed of the vehicle as the speed increases past each multiple of the given speed increment.

The system 12 may receive the vehicle speed from, for example, a vehicle speed sensor. For example, the system 12 may use sensor data from a wheel speed sensor, a GPS sensor, or any other sensor that accurately determines the vehicle speed.

Application of a soft lock allows the driver to remove their foot off of the accelerator pedal and the vehicle will coast (or move without further application of the vehicle's propulsion system or naturally decelerate) until the soft lock speed is reached, and then maintain speed at the soft lock. For example, if the driver accelerates the vehicle to 75 mph, and the soft lock engages every 10 mph, the soft lock will be established at 70 mph. If the driver removes their foot from the accelerator, the vehicle may coast down to 70 mph, and then maintain speed at 70 mph until either the accelerator or the brake is pressed.

In some examples, pressing the brake pedal removes all soft locks. That is, pressing the brake briefly and then releasing the brake would disengage any soft lock at all multiples of the given speed increment, allowing the vehicle to coast to a stop should the driver not apply any further pressure to the gas pedal. The soft lock may not re-engage until the driver again accelerates past a multiple of the increment. For example, when traveling at 70 mph and the driver brakes to 65 mph, all soft locks may be removed until the driver again accelerates past an increment of 10 mph (e.g., 70 mph). In some examples, the soft lock may re-engage after a period of time after the brake has been released.

In some examples, the soft lock will not engage until a threshold speed has been reached. For example, the soft lock may not engage unless the vehicle is going at a speed greater than 50 mph. The increment that the soft lock engages at may be any value. For example, the vehicle speed increment may be 20 mph, 10 mph, 5 mph, or 1 mph. The increment may be adjustable (e.g., by the driver) via, for example, programmable controls at a display of the vehicle. The speedometer 22 may visually indicate the soft lock 20. For example, the speed at which the soft lock 20 is engaged at (70 mph in FIG. 2) may be highlighted or include additional indicia.

The system may process image data from the camera 14a to recognize traffic signs, identify a current speed limit based on the traffic signs, and additionally indicate the current speed limit on the speedometer. The system may determine the current speed limit via other means, such as GPS as well. In some examples, the soft lock may automatically be set to the current speed limit when the vehicle is traveling at a speed greater than the speed limit (or some offset thereof). Optionally, the soft lock speed control system may not reset or operate responsive in part to a vehicular vision system or car2car communication system or the like, where the vehicular vision system or car2car communication system determines that one or more other vehicles are ahead of the equipped vehicle and applying a soft lock speed setting of the equipped vehicle is not appropriate or safe to do. For example, the vehicular vision system or car2car communication system may determine that one or more vehicles in the path of travel of the equipped vehicle are traveling at a speed less than or significantly less than a desired soft lock speed and determine that applying that soft lock speed setting would not be appropriate based on the difference or significant difference in the travel speed of the other vehicle (s) and the equipped vehicle.

The system may provide a notification when engaged and/or when disengaged. For example, the system may provide a visual (e.g., via a display disposed within the vehicle) or audible alert or haptic feedback (e.g., steering wheel vibrations) to the driver that the soft lock 20 has been engaged, adjusted, or disabled.

Thus, the driver assist system allows the driver to remove their foot from the accelerator pedal at any point for a rest or other reason without the need to engage any additional systems (e.g., a cruise control system). The system does not require any additional sensors to control (e.g., stop, slow down, and/or keep the vehicle in the current lane) the vehicle. The system does not require any manual input from the driver, which minimizes driver distraction. The system also requires fewer parameters than other typical driver assist systems (e.g., adaptive cruise control). The system reduces the amount of sensors and logic to reduce cost and offer a cheaper failsafe system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663;

5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252; 9,598,016; 9,264,672; and/or 6,642,851, and/or U.S. Publication Nos. US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver assist system, the vehicular driver assist system comprising:
    a vehicle speed sensor disposed at a vehicle equipped with the vehicular driver assist system;
    an electronic control unit (ECU) comprising electronic circuitry and associated software;
    wherein the electronic circuitry of the ECU comprises a processor for processing sensor data generated by the vehicle speed sensor;
    wherein the ECU, responsive to processing by the processor of sensor data generated by the vehicle speed sensor, determines speed of the vehicle;
    wherein the ECU, responsive to determining that the speed of the vehicle reaches a vehicle soft lock speed of travel of the vehicle speed, automatically enables a vehicle soft lock;
    wherein the ECU, responsive to enabling the vehicle soft lock and the vehicle reducing speed to the vehicle soft lock speed by coasting, maintains the vehicle speed at the vehicle soft lock speed;
    wherein the ECU, responsive to determining that the speed of the vehicle has increased a multiple of a vehicle speed increment above the vehicle soft lock speed, automatically sets an increased vehicle soft lock speed that is the multiple of the vehicle speed increment above the vehicle soft lock speed; and
    wherein the ECU, responsive to the vehicle reducing speed to the increased vehicle soft lock speed by coasting, maintains the vehicle speed at the increased vehicle soft lock speed.

2. The vehicular driver assist system of claim 1, wherein the vehicle speed increment is 5 miles per hour.

3. The vehicular driver assist system of claim 1, wherein the vehicle speed increment is 10 miles per hour.

4. The vehicular driver assist system of claim 1, wherein the ECU, responsive to receiving an indication that the brakes of the vehicle have been engaged, disables the vehicle soft lock.

5. The vehicular driver assist system of claim 1, wherein a value of the vehicle soft lock speed is visually indicated on a speedometer of the vehicle.

6. The vehicular driver assist system of claim 1, wherein the vehicle speed increment is adjustable by a driver of the vehicle.

7. The vehicular driver assist system of claim 1, wherein the ECU determines the vehicle soft lock speed when the vehicle speed is greater than a threshold speed.

8. The vehicular driver assist system of claim 1, wherein the ECU, based at least in part on a speed limit of the road the vehicle is traveling along, sets the vehicle soft lock speed at the speed limit.

9. The vehicular driver assist system of claim 8, further comprising a camera disposed at the vehicle and viewing exterior and forward of the vehicle, the camera capturing image data, wherein the ECU, responsive to processing by the processor at the ECU of image data captured by the camera, determines the speed limit of the road the vehicle is traveling along.

10. The vehicular driver assist system of claim 1, wherein the ECU determines a maximum speed setting for the vehicle soft lock speed.

11. The vehicular driver assist system of claim 10, wherein the maximum speed setting for the vehicle soft lock speed is based on one selected from the group consisting of (i) a user preference and (ii) a manufacturer setting.

12. The vehicular driver assist system of claim 10, wherein the maximum speed setting for the vehicle soft lock speed is based on a speed limit of the road the vehicle is traveling along.

13. A vehicular driver assist system, the vehicular driver assist system comprising:
    an electronic control unit (ECU) disposed at a vehicle equipped with the vehicular driver assist system, wherein the ECU comprises electronic circuitry and associated software;
    wherein the ECU, responsive to determining that speed of the vehicle reaches a vehicle soft lock speed of travel of the vehicle speed, automatically enables a vehicle soft lock at the vehicle soft lock speed;
    wherein a value of the vehicle soft lock speed is visually indicated on a display of the vehicle;
    wherein the ECU, responsive to enabling the vehicle soft lock and the vehicle reducing speed to the vehicle soft lock speed by coasting, maintains the vehicle speed at the vehicle soft lock speed;
    wherein the ECU, responsive to determining that the speed of the vehicle has increased a multiple of a vehicle speed increment above the vehicle soft lock speed, automatically sets an increased vehicle soft lock speed that is the multiple of the vehicle speed increment above the vehicle soft lock speed;
    wherein the ECU, responsive to the vehicle reducing speed to the increased vehicle soft lock speed by coasting, maintains the vehicle speed at the increased vehicle soft lock speed;
    wherein the ECU, responsive to receiving an indication that the brakes of the vehicle have been engaged, disables the vehicle soft lock; and
    wherein the ECU, responsive to disabling the vehicle soft lock, does not maintain the vehicle speed at the vehicle soft lock speed or the increased vehicle soft lock speed.

14. The vehicular driver assist system of claim 13, wherein a value of the vehicle soft lock speed is visually indicated on a speedometer of the vehicle.

15. The vehicular driver assist system of claim 13, wherein the vehicle speed increment is adjustable by a driver of the vehicle.

16. The vehicular driver assist system of claim 13, wherein the ECU, based at least in part on a speed limit of the road the vehicle is traveling along, ECU sets the vehicle soft lock speed at the speed limit.

17. The vehicular driver assist system of claim 13, further comprising a camera disposed at the vehicle and viewing exterior and forward of the vehicle, the camera capturing image data, wherein the ECU, responsive to processing by the ECU of image data captured by the camera, determines a speed limit of the road the vehicle is traveling along.

18. A vehicular driver assist system, the vehicular driver assist system comprising:
- a vehicle speed sensor disposed at a vehicle equipped with the vehicular driver assist system;
- a camera disposed at the vehicle and viewing exterior and forward of the vehicle, the camera capturing image data;
- an electronic control unit (ECU) comprising electronic circuitry and associated software;
- wherein the electronic circuitry of the ECU comprises a processor for processing image data captured by the camera and sensor data generated by the vehicle speed sensor;
- wherein the ECU, responsive to processing by the processor of sensor data generated by the vehicle speed sensor, determines speed of the vehicle;
- wherein the ECU, responsive to processing by the processor at the ECU of image data captured by the camera, determines a speed limit of the road the vehicle is traveling along;
- wherein the ECU, responsive to determining the speed limit of the road of the vehicle is travelling along, determines a maximum speed setting for a vehicle soft lock speed;
- wherein the ECU, responsive to determining that the speed of the vehicle reaches the vehicle soft lock speed of travel of the vehicle speed, automatically enables a vehicle soft lock at the vehicle soft lock speed at a value that is less than the maximum speed setting;
- wherein the ECU, responsive to enabling the vehicle soft lock and the vehicle reducing speed to the vehicle soft lock speed by coasting, maintains the vehicle speed at the vehicle soft lock speed;
- wherein the ECU, responsive to determining that the speed of the vehicle has increased a multiple of a vehicle speed increment above the vehicle soft lock speed, automatically sets an increased vehicle soft lock speed that is the multiple of the vehicle speed increment above the vehicle soft lock speed; and
- wherein the ECU, responsive to the vehicle reducing speed to the increased vehicle soft lock speed by coasting, maintains the vehicle speed at the increased vehicle soft lock speed.

19. The vehicular driver assist system of claim 18, wherein the vehicle speed increment is 5 miles per hour.

20. The vehicular driver assist system of claim 18, wherein the vehicle speed increment is 10 miles per hour.

* * * * *